June 22, 1965 A. J. BRYANT 3,190,046
DEVICE FOR HOLDING A ROTARY CUTTING TOOL
Filed April 7, 1961 3 Sheets-Sheet 2
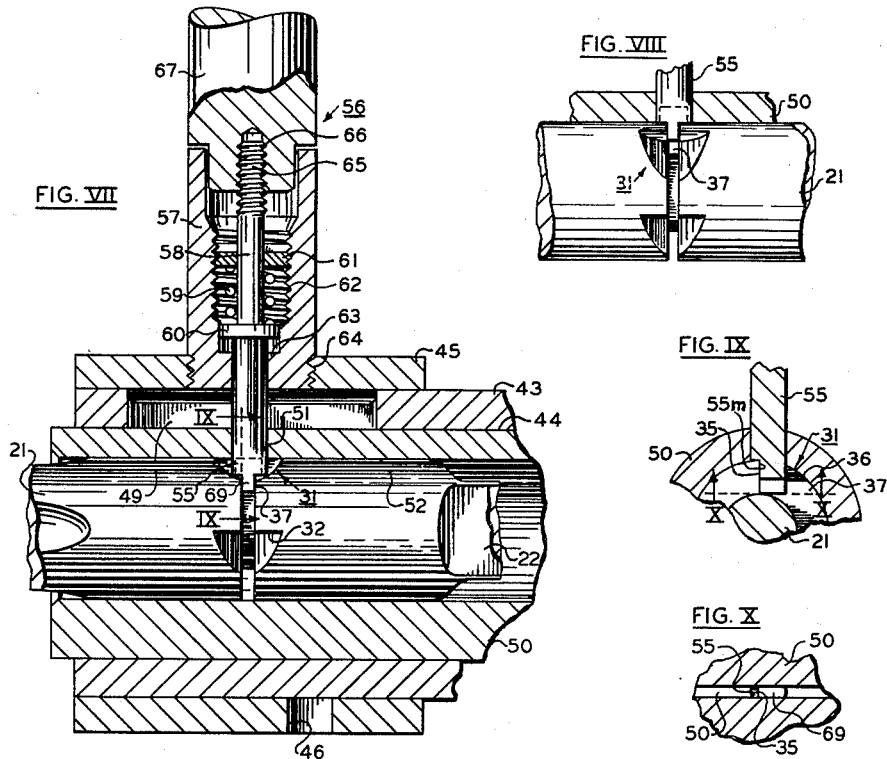
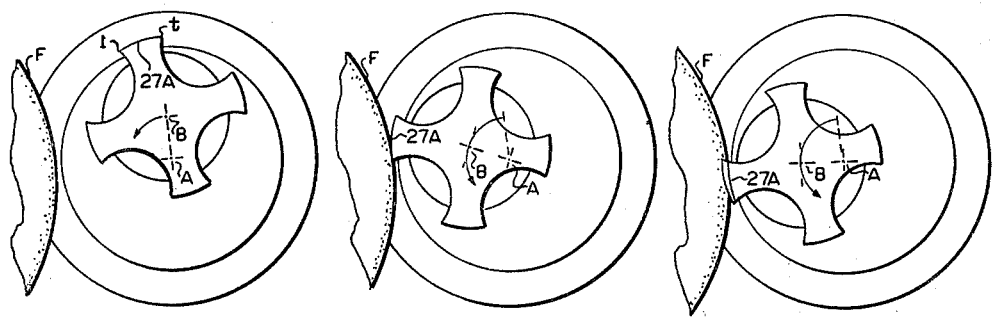
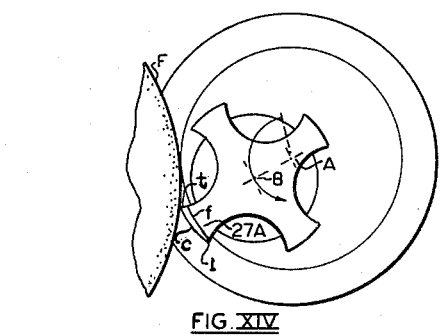
*INVENTOR.*
ANDREW J. BRYANT
BY
Pearce and SchaeperKlaus
*Att'ys.*

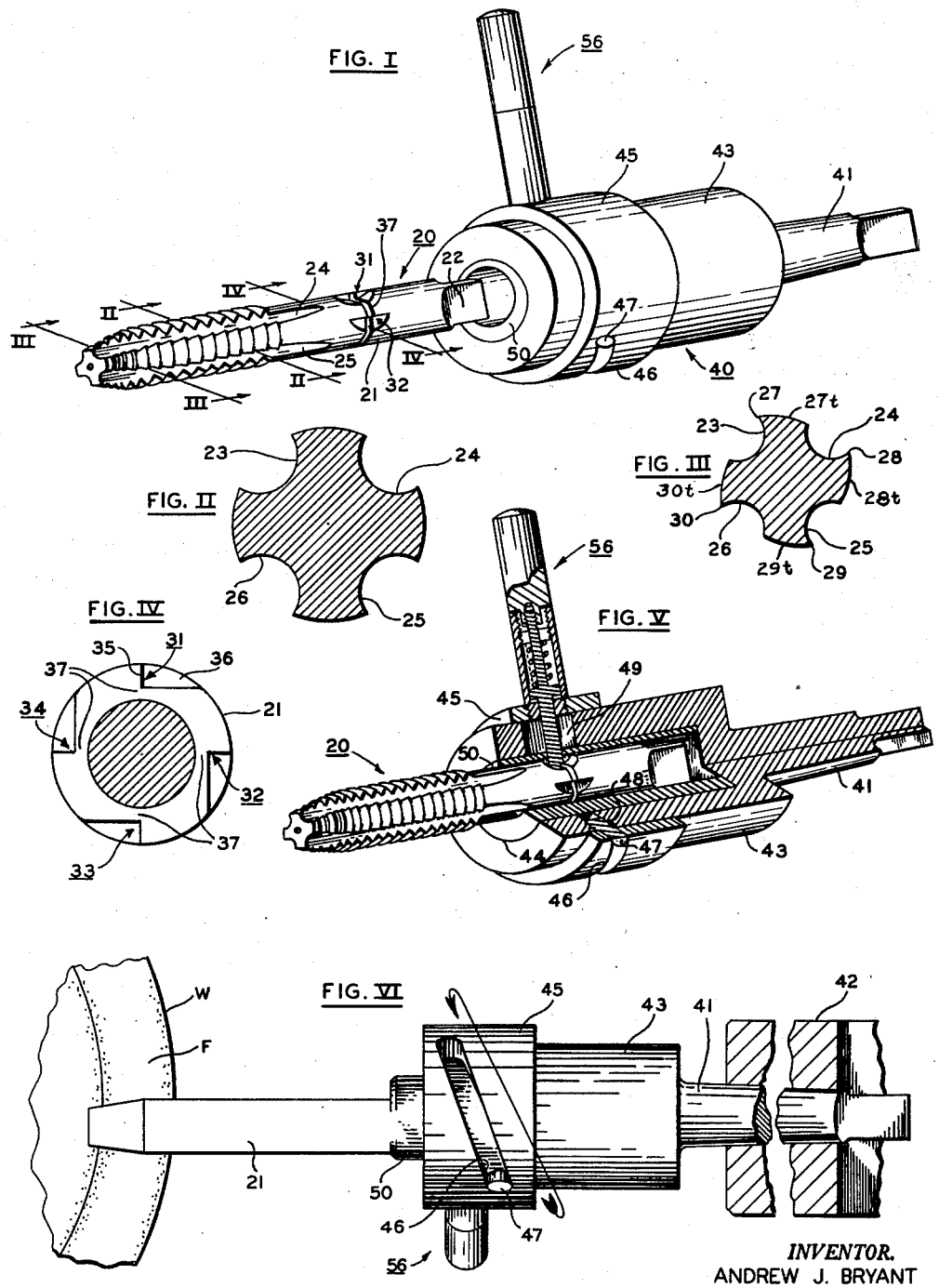

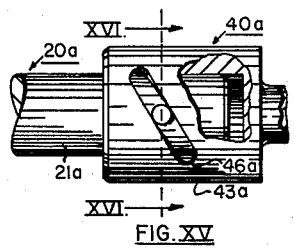
FIG. XV
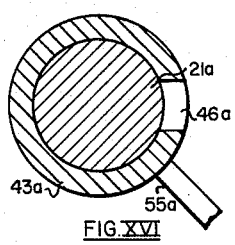
FIG. XVI
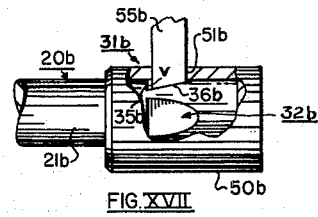
FIG. XVII
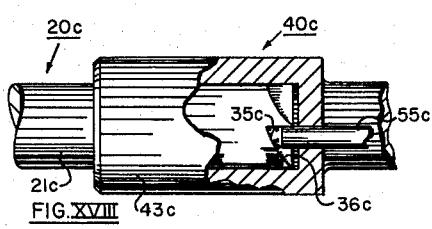
FIG. XVIII
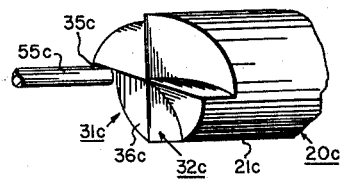
FIG. XIX
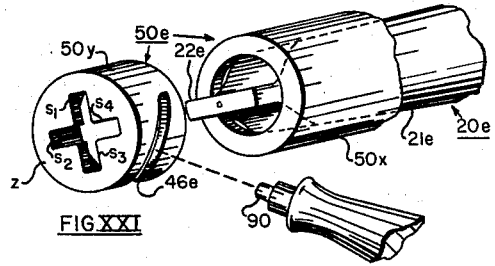
FIG. XXI
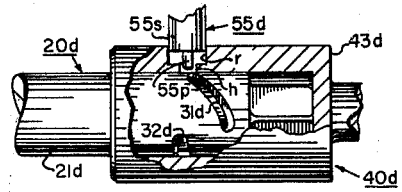
FIG. XX
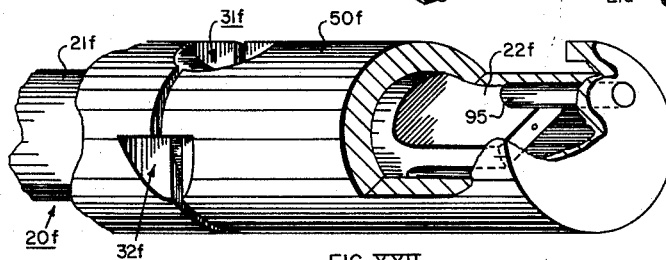
FIG. XXII
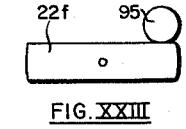
FIG. XXIII
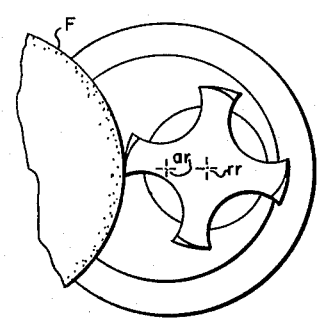
FIG. XXV
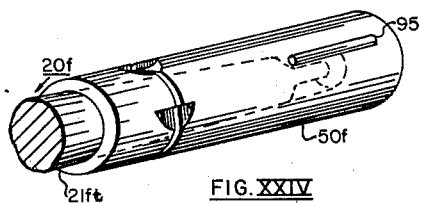
FIG. XXIV
*INVENTOR.*
ANDREW J. BRYANT
BY
*Pearce and Schaeperklaus*
*attys*

3,190,046
DEVICE FOR HOLDING A ROTARY
CUTTING TOOL
Andrew J. Bryant, 900 Arthur Ave., Bristol, Pa.
Filed Apr. 7, 1961, Ser. No. 114,580
11 Claims. (Cl. 51—225)

This invention relates to rotary cutting tools and devices for holding same, and in particular, to a new and improved rotary cutting tool, tap, or the like, the manufacture and sharpening thereof, and a new and improved device or workholder adapted to hold such a rotary cutting tool during the manufacture thereof or during the sharpening or grinding operation thereon.

An object of this invention is to provide for novel and improved rotary cutting tool.

An ultimate object of this invention is to provide for a unique rotary cutting tool which incorporates therein cutting edges the precise nature of which accurately and exactly duplicate the profile of a thread or threads of a bolt or the like to be threaded to the tapped hole bored by the tool.

Another object of this invention is to provide for accurate, precise relief or clearance desired on the trailing surface behind each cutting edge of a rotary cutting tool.

Another object of this invention is to provide for accurate longitudinal alignment with respect to each other of a multiple number of fluted surfaces and cutting edges formed as a result of such fluted surfaces.

Another object of this invention is to provide for a rotary cutting tool having means incorporated therein by which accurate and precise sharpening and grinding of its cutting edges is consistently reproduced.

Another object of this invention is to provide for a rotary cutting tool by which accurate regular or irregular positioning or spacing of its fluted surfaces is achieved.

A further object of this invention is to provide for indexing means or registrations within or upon a rotary cutting tool itself by which it may be precisely and successively indexed directly to the device holding same or its workholder.

Another object of this invention is to provide for a consistent reproduceable flute grind for each of the fluted surfaces on a rotary cutting tool in every grinding operation thereon, and as a result thereof, effect true symmetry of cutting edges on a rotary cutting tool.

A still further object of this invention is to provide for means on a rotary cutting tool which precisely and successively directly indexes same to the device holding it, and thereby effects true symmetry of the cutting edges upon sharpening or grinding thereof.

A further object of this invention is to provide for the incorporation of indexing means in or on a rotary cutting tool by which accurately and consistently spaced fluted surfaces are formed upon the tool therefrom, thereby effecting in subsequent grinding thereon, a precise sharpening of the cutting edges formed from the fluted surfaces.

Cutting relief or clearance on a rotary cutting tool is ordinarily provided along the trailing portion of each cutting edge formed as a result of each fluted surface formed into the tool. This relief may take the form of axial relief on each cutting edge, radial relief along the trailing portion of the cutting edge, or a combination of both for each cutting edge. Many complicated tool fixtures have been developed in the past which grind axial relief or radial relief. A cutting relief may be obtained, therefor, for each cutting edge, which will prove adequate for the general purpose of boring tap holes. However, there are a number of deficiencies in both the present-day holders and rotary cutting tools or taps which effect the tapped-hole quality, the finish thereof, and the tool or tap life itself. For example, in the case of smaller sized tap drills, ground tap drills, particularly general-purpose drills as purchased, are not consistent in respect to the flute grind. Ordinarily, upon correcting the flute grind, tapped-hole quality and tap life may be somewhat increased. Secondly, cutting pressure on the tool is ordinarily balanced between the several fluted surfaces of the tool. This balance depends upon the evenness of the spacing of the cutting edges one from another, and the cutting relief incorporated therein. This spacing in turn depends upon the spacing or accuracy of the flutes formed in the tool. Cutting pressure affects the life of the tool and the quality of the tapped hole.

An object of this invention, therefore, is to provide for a constantly accurate and consistent flute grind for each rotary cutting tool made by incorporating therein novel features of this invention.

A further object of this invention is to provide for true symmetry of cutting edges in a rotary cutting tool by which a tapped hole cut by such edges has an improved finish and quality.

Another object of this invention is to provide for a predetermined effective cutting relief that is generated in each of the cutting edges and the trailing portions thereof, and which relief is precisely and accurately determined for and incorporated into each cutting edge and trailing portion thereof, thus precisely reflecting the desired tapped-hole size and the finish thereof. Such predetermined effective cutting relief may include merely radial relief, or merely axial relief, or a combination of radial and axial relief.

It is a further object of this invention to provide for a holder for a rotary tool which includes novel features by which such predetermined effective cutting relief or clearance on the rotary cutting tool are effected, with a minimum of set-up required of the holder.

Another object of this invention is to provide for a new and improved workholder.

Another object of this invention is to provide for structure specifically designed into a device for holding a rotary cutting tool for cooperation with such tool to produce a predetermined cutting relief or clearance upon the tool.

A further object of this invention is to provide for means mounted on or associated with the holder which directly engages the indexing means on the novel cutting tool, thereby precisely indexing the tool to the holder.

Another object of this invention is to provide for a device by which a predetermined effective cutting relief is generated into a rotary cutting tool inserted therein by simple operation of the device itself upon the tool, rendering unnecessary the exercise of judgment otherwise required by the operator, whether such relief encompasses axial relief, radial relief, or a combination of both, upon the rotary tool.

Another object of this invention is to provide for a device which is of a simplified construction, and readily and easily operated by hand.

A further object of this invention is to provide for means associated with the novel device by which a tool is easily, quickly, successively and precisely, directly indexed to the device whereby predetermined, precise, accurate sharpening of each cutting edge and the trailing portion thereof on a tool is accomplished.

A still further object of this invention is to provide for a device by which true symmetry of the cutting edges of a rotary tool is retained upon regrinding of the tool therein, as the tool is successively indexed to the device for sharpening purposes.

Another object of this invention is to provide means associated with or included in the device and which cooperate with a rotary cutting tool to precisely longitudinally align each of its cutting edges with respect to each other, thereby accurately effecting true symmetry of such cutting edges.

What presently appears to be a preferred embodiment of the invention is illustrated in the accompanying drawing in which the same reference characters used in the following description are applied to corresponding parts in the figures in the drawing, in which:

FIG. I is a view in perspective embodying the invention, of a novel rotary cutting tool positioned preparatory to insertion thereof in a novel holder therefor;

FIG. II is a sectional view taken on line II—II of FIG. I;

FIG. III is a sectional view taken on line III—III of FIG. I, in the leading or tapered portion of the tool;

FIG. IV is a sectional view taken on line IV—IV of FIG. I;

FIG. V is a perspective view partly broken away, of the novel tool in position in the device shown in FIG. I, prior to sharpening of the tool;

FIG. VI is a view in elevation of tool and device therefor shown in FIG. I in relation to the face of a grinding wheel after a grinding operation has been performed on the tool;

FIG. VII is an enlarged fragmentary view in elevation, partly in section, of portions of the tool and device therefor shown in FIG. V;

FIG. VIII is a fragmentary elevational view, partly in section, of tool and holding device therefor;

FIG. IX is a sectional view taken on line IX—IX of FIG. VII;

FIG. X is a sectional view taken on line X—X of FIG. IX;

FIG. XI through XIV are schematic diagrams illustrating positions of a cutting edge and its trailing portion between commencement and finishing of relief cut thereinto;

FIG. XV is a fragmentary elevational view of a modified form of tool and holding device therefor in which my invention is embodied;

FIG. XVI is a sectional view taken on line XVI—XVI of FIG. XV, with the pin rotated to an extreme position.

FIG. XVII is a fragmentary elevational view, partly broken away, of another modified form of my invention;

FIG. XVIII is a fragmentary elevational view, partly broken away, of still another modified form of my invention;

FIG. XIX is a fragmentary view in perspective of the tool shown in FIG. XVIII;

FIG. XX is a fragmentary elevational view partly broken away of another embodiment of the invention;

FIG. XXI is a fragmentary view in perspective of a further modified form of a tool and holding device therefor embodying my invention;

FIG. XXII is a fragmentary view in perspective of another modified form of a tool and holding device therefor embodying the invention;

FIG. XXIII is a schematic diagram of the tool and pin shown in FIG. XXII;

FIG. XXIV is another fragmentary view in perspective of the tool and holding device therefor shown in FIG. XXII; and FIG. XXV is a schematic diagram illustrating a different relationship between tool and holding device therefor than that shown in FIGS. XI—XIV in generating relief on a tool.

A rotary cutting tool 20, and novel holding device 40 therefor and cooperating therewith, are shown in FIGS. I through X of the drawings as an illustrative embodiment of my invention.

While a four-fluted tool commonly called a tapering reamer or tap of the right-handed variety, is described as an illustrative embodiment of the invention herein disclosed, it is to be understood that the invention is capable of being adapted to fluted rotary cutting tools in general, righthanded or lefthanded, the fluted surfaces of which are adjacent the cutting edges thereof, and off of which fluted surfaces the cutting edges are generated and which tools include but are not limited to milling cutters, twist drills, taper reamers, center drills, tap drills, countersinks, step drills, valve seat cutters, core drills, hand reamers, and acme taps.

Tool 20 shown in FIGS. I through X, comprises a 4-fluted tap having a cylindrical shank 21, on one end of which a tang 22 is provided for use in holding the tap during use. From the other end of shank 21 extends a portion in which a plurality of fluted surfaces or flutes, four in this instance, 23, 24, 25, 26 as shown in FIGS. I, II, are machined or otherwise formed. Tapering of each of the flutes at the end of tap 20 opposite tang 22 results in formation of cutting edges 27, 28, 29, 30 along respective corresponding edges of each of the flute surfaces 23, 24, 25, 26, shown in FIGS. I and III. Each of the cutting edges 27, 28, 29, 30 is disposed at the intersection of a flute surface and a tool surface 27t, 28t, 29t, 30t, respectively, and has the usual series of ribs or teeth formed along the shank of tap 20. The number, size and spacing of teeth along a cutting edge depends upon the angle of chamfer, and size of tap 20.

A plurality of indexing means or abutments 31, 32, 33, 34 (FIGS. I, IV, VII), each of which is hereinafter referred to as an indexing surface or point of registry, are provided along the periphery of or otherwise incorporated into the stock or shank 21 of tap 20, preferably in the solid shank of the tap. Each particular flute 23, 24, 25, 26 is correlated to a respective indexing surface 31, 32, 33, 34.

Correlation here means the geometrical position between an indexing surface of registry and its corresponding fluted surface on the rotary tool, such that upon indexing such indexing surface of registry to device 40, its correlated fluted surface, and thus the cutting edge resulting therefrom, is so positioned in device 40 that, upon operation of device 40 in relation to grinding wheel W, such cutting edge is fed to grinding wheel W to properly sharpen same. In right-handed four-fluted tap 20, fluted surface 23 is correlated to indexing surface of registry 31. This correlation provides for a consistent and uniform grinding operation upon cutting edge 27 formed adjacent fluted surface 23 and upon tool surface or trailing portion 27t in every instance of sharpening thereon, as will be more clearly pointed out hereinafter.

Indexing abutments 31, 32, 33, 34 are substantial or exact duplicates wherefore the following description of abutment 31 is applicable to the remaining abutments as well. As shown in FIGS. I, IV, VII, surface of registry 31 comprises a flat 35 extending axially along shank 21 and radially inwardly from the periphery of shank 21 to curved base surface 36 with which such flat 35 bounds a recess or pocket formed in the body. The same formation is provided for each of the other surfaces of registry 32, 33, 34. Each of the surfaces or points of registry 31, 32, 33, 34 is precisely angularly spaced from every other surface of registry around the periphery of the tool so that precise successive indexing of 4-fluted tap 20 to device 40 may be accomplished as necessary. Four-fluted tap 20 is thus provided at exact 90° intervals about its shank with four surfaces of registry 31, 32, 33, 34 to which fluted surfaces 23, 24, 25, 26 respectively are correspondingly correlated. Thus, each flute in tap 20, being correlated to a distinct and separate surface of registry on tap 20, is correspondingly accurately spaced, each from another, in the same fashion as each surface of registry is precisely angularly spaced each from another. In a grinding operation then, tap 20 is successively indexed to each of these surfaces, and the accomplishment of total successive indexing depends, of course, on the number of flutes in the tap. By rotation and/or revolution of tap 20, with a particular surface of registry in indexed position to device 40, its corresponding fluted surface will move relative to grinding wheel W while the cutting edge formed on such fluted surface, i.e., the teeth on a cutting edge in the case of tap 20, is being "relieved" in a predetermined or calculated manner depending upon the angular position of tap 20 relatively to face F of grinding wheel W, and upon the structure associated with or incorporated into device 40 which transmits predetermined movement for tap 20 to the tap to accomplish the desired axial and radial relief. Marking of an indexing surface or point of registry, if desired will, of course, identify that surface to its corresponding flute.

Each remaining surface or registry 32, 33, 34 in tap 20 is provided for each other flute 24, 25, 26, respectively, on tap 20. As has been noted, each surface of registry 31, 32, 33, 34 is cut into tap 20 at equally spaced intervals of 90° about the periphery of its shank; however, it should be understood that each such spaced interval is dependent upon the spacing desired between each fluted surface of a rotary cutting tool, one from the other, and that it is conceivable that flute spacing may be irregular or varied from one flute to another on a particular rotary cutting tool. This in no way lessens the accuracy of a consistent flute grind in a tool embodying this invention.

Thus, in the manufacture of a particular rotary cutting tool, the surfaces or points of registry 31, 32, 33, 34 provided for the proper and accurate indexing of tool 20 to device 40, may be incorporated into the tool at predetermined or calculated intervals of space with respect to each other prior to the machining of the flutes therein. The collorary to this is that the position of each flute of the tool is regulated by the location of a respective distinct and separate surface or point of registry 31, 32, 33, 34 previously provided on the tool. In tap 20, the position of flute 23 is regulated by surface of registry 31, the position of flute 24 is regulated by surface of registry 32; and so on, with the remaining fluted surfaces being regulated by their respective, distinct and separate surfaces of registry.

As a result of this method of manufacturing tap 20, the spacing of each flute to the next flute is wholly dependent upon the spacing between such flutes' correlated surfaces of registry. Consistent grinding and regrinding is thence possible for each cutting surface and its adjacent trailing portion, when the tool is repeatedly indexed to device 40 since the way in which the tool is indexed to its holder is consistent in every grinding operation on the tool. Such a grind is generated in the tool due to this method of manufacture, when each indexing means is accurately incorporated into the tool. It may be noted here that incorporation of such indexing means is nevertheless possible in present day standard rotary tools.

Consistent, repeated and accurate axial locating or positioning of tap 20 in device 40 is made possible by an annular groove or keyway 37 formed in the tool shank perpendicular to its axis (FIGS. I, IV, VII), and located midway of the surfaces of registry 31, 32, 33, 34 provided on shank 21, and extending in greater radial depth than the respective recesses or pockets each respectively bounded in part by one of said indexing abutments. Groove or keyway 37 cooperates with a key 69, hereinafter fully described, that is axially stationary with respect to and mounted upon device 40, whereby during the successive indexing operations performed on tool 20, each of the cutting edges on the tool is properly longitudinally or axially aligned with respect to the others, during and after each cutting edge (the line of ribs or teeth in the case of tap 20) has been sharpened and relieved. Thus, true symmetry of cutting edges is effectively achieved, although correct positioning of the surfaces of registry on tap 20 to device 40 also assures such symmetry where groove 37 is not provided in the tool.

Tap 20 is held in novel device 40 for the purpose of consistently grinding with preciseness and accuracy each of its cutting edges and trailing portions thereof, duplicating exactly the original required or precise relief desired in the tool. As shown in FIGS. I, V, VI, VII, holder 40 comprises a solid tapering shaft 41 that, during use, is adapted to be securely held during a sharpening or grinding operation, in a jaw chuck, tail stock, fixture, or other suitable holding means such as is shown at 42 (FIG. VI). Shaft 41 has an integral hollow cylindrical spindle or arbor 43 in which concentric bore 44 is provided therein and about which cylindrical sleeve 45 is mounted and freely rotatably thereabouts within limits as will be hereinafter described. The axis of sleeve 45 is coincident with that of spindle 43. Sleeve 45 (FIGS. V, VII) defines an elongated, arcuate helical slot 46 against a bounding face or faces of which cam follower 47, securely fastened to and projecting from a fixed position on the outer periphery of spindle 43, abuts. Cam follower 47 comprises a post stud, the lower half of which is threaded (FIG. V) and screwed into a radially extending, internally threaded bore 48 in spindle 43 after sleeve 45 has been mounted upon spindle 43 with its slot 46 disposed in registry with bore 48. Thus sleeve 45 is rotatable about the axis of spindle 43 and displaceable longitudinally of spindle 43 to the extent of the arcuate and axial length of helical slot 46 in which stud 47 cooperatingly projects. In FIG. VI sleeve 45 is shown (by the arrow) to be advanced fully to the left along spindle 43, in the corresponding limit of rotation established by stud 47 and slot 46. Were the helix angle in slot 46 0°, i.e., if the arcuate longitudinal axis of slot 46 were to lie in a right, cross-sectional plane of sleeve 45, then, of course, sleeve 45 would merely rotate or advance angularly about spindle 43 to the extent of the arcuate length of slot 46, and not axially advance to the left nor retract to the right along spindle 43.

Spindle 43 further defines an arcuate or clearance opening 49, as seen in FIGS. V and VII, and which is preferably rectangular in appearance upon the cylindrical surface of spindle 43. The peripheral extent of arcuate opening 49 subtends an angle, the vertex of which is at the axis of the spindle 43, and the magnitude of which precludes interference between the bounding surfaces of arcuate opening 49 in spindle 43 and a pin 55 mounted on the sleeve 45 rotating within limits established by cooperation of stud 47 with slot 46. The axial length of opening 49 (seen in FIG. VII), which may be measured along the straight line that generates bore 44 about the axis of spindle 43, is similarly related to the axial distance through which sleeve 45 may be axially moved along spindle 43 within limits established by stud 47 received in slot 46. Arcuate opening 49 in spindle 43 provides access for means 55 which locks and indexes tap 20 directly to holder 40 for accurate and successive indexing of the tap. In the actual manufacture of spindle 43, the opening 49 may be made somewhat larger than the minimum dimensional requirements stated above, in order to provide ease of movement of sleeve 45 upon spindle 43 and consequently, of the advancement and retraction of the tool upon rotation of the sleeve.

Means is provided within concentric bore 44 to receive the tool 20. An eccentric bushing or adaptor 50 is slidably received and freely movable within the open forward end of bore 44 in spindle 43, and is provided with an aperture 51 (FIG. VII). In the immediate embodiment, aperture 51 radially extends through the thinner portion of the bushing, i.e. the portion of the casing of the bushing where its wall thickness is at a minimum due to the eccentric location of bore 52 in 50. The axis of the outer right cylindrical surface of bushing 50 in the illustrative embodiment is coincident with the axes of spindle 43 and sleeve 45, whereas the axis of the internal cylindrical bore 52 of bushing 50 is spaced from and parallel to said axes. It is to be noted that eccentric or concentric bushings of various internal diameters can be held within workholder 40 in order to accommodate various side tools or taps for radial relief thereon.

Means or indexing pin 55 which cooperates with tap 20 to index same, is associated with holder 40, and in the instant embodiment (FIGS. V, VII) is preferably included as part of a plunger mechanism housed in a handle 56 fixedly mounted on sleeve 45 of holder 40. Indexing pin 55 extends radially through sleeve 45, arcuate opening 49 defined in spindle 43, aperture 51 in bushing 50, and projects into bore 52 of the bushing so that, upon insertion of tap 20 into the bushing, indexing pin 55 is capable of engaging or registering directly with a surface or point of registry incorporated therein. Aperture 51 in adaptor 50 is of a slip-fit size or diameter in relation to the size or diameter of indexing pin 55 for unison movement to provide a fixed relationship between adaptor and tool 20 during grinding of the latter. In this manner, the eccentricity of bushing 50 directly affects the ground surface configuration of tap 20. Thus, the extent and/or type of movement during the grinding operation is the same for both adaptor 50 and tap 20 when the movement corresponds to the rotational and/or eccentric movement provided by bushing 50, and the movement thereof is limited to or otherwise corresponds to the extent and/or type of movement provided for sleeve 45 by means of the limits established by slot 46 riding on stud 47.

Indexing pin 55 constitutes an extension of plunger 58 included in handle 56, and by operation of the upper portion of the handle, is capable of being reciprocably guided to and from any one of the surfaces or points of registry incorporated within tap 20. The lower section 57 of handle 56 houses the plunger mechanism comprising a plunger 58 about which is mounted a spring 59 held thereabouts under compression between an integral collar 60 on plunger 58 and a slip-fit nut or retainer 61 fixedly threaded to the internally-threaded bore 62 of lower portion 57. Collar 60 is thus normally biased towards an annular boss 63 radially mounted internally adjacent the one end of lower portion 57, which said end is threaded and fixedly secured to a threaded aperture 64 in sleeve 45. The other end of plunger 58 is threaded as at 65 and screwed into a threaded bore 66 of the reduced lower end of upper portion 67 of the handle. Thus, indexing pin 55 is normally spring-biased towards and projects into bore 52 of adaptor 50, and reciprocably moves from bore 52 by a force applied to the plunger and indexing pin against the bias applied by spring 59.

During the successive indexing of tap 20 to holder 40, it will be clearly seen from an explanation of operation which follows, that indexing pin 55 is easily actuated by rotation of tap 20 whether or not lower and upper portions 57, 67 of handle 56 are tightly or loosely held together by means of threaded end 65 of plunger 58 and threaded bore 66 of portion 67.

A key 69 is provided at the end of indexing pin 55, which key is adapted to cooperate with or engage annular groove or keyway 37 located midway between surfaces of registry 31, 32, 33, 34 in tap 20, thereby axially positioning tap 20 to its holder 40, whereby the chamfered length of each cutting edge of tap 20 is consistently and precisely grindable to the same profile or configuration for each cutting edge of a given tool during successive indexing operations on the tool. It should be obvious and clear that annular groove 37 and key 69 therefor, need not necessarily be integral with or particularly related to indexing pin 55 and/or the surfaces of registration on tap 20. A key such as 37 may be stationarily mounted elsewhere on holder 40 or on an adaptor such as 50, so as to radially project into the bores of spindle 43 or adaptor 50, whichever may be the case, and which would engage an annular keyway or groove formed upon and at an advantageous point along the shank of a rotary cutting tool.

The operation of consistently and accurately sharpening a rotary cutting tool by this invention is readily, easily and quickly accomplished, with a minimum of set-up compared to other more complicated workholder fixtures. Cutting tool 20 is slidably inserted into adaptor 50 in the bore of spindle 43. Tang 22 passes indexing pin 55 and key 69 by simply rotating the tang out of contact therewith. The pin and key then engage shank 21 at a point where the shank and a side of the tang meet. A quick rotating turn of the tool and a slight thrusting pressure will allow advance of the tool further into bore 52, as shank 21 forces retraction of pin 55 and key 69 from bore 52, while compressing spring 59 at the same time. By further advance of the tool into the spindle, key 69 quickly finds and engages annular groove 37 provided in tap 20 (FIG. VIII), dropping thereinto to axially position the tool. Further hand rotation of the tool brings indexing pin 55 into cooperative engagement or registration with surface of registry 31, as shown in FIG. VII. FIG. VII shows that collar 60 does not seat upon annular boss 63 after indexing pin 55 has properly engaged surfaces of registry 31, so that as much benefit of the expansive strength of spring 59 is available as possible to lock pin and surface together. FIGS. IX and X show that indexing pin 55 is modified as at 55m whereby side 55m thereof registers with flat 35 of surface or registration 31 to ensure a positive locking of indexing pin 55 to indexing means 31. The pocket or recess bottom 36 acts as a camming surface on indexing pin 55 during rotation of tap 20 to its next successive indexing position. In counter clockwise rotation of tap 20, as viewed in FIG. IX, indexing pin 55 will ride on bottom 36, and thereafter upon the surface fo shank 21 until indexing pin 55 drops into the next surface of registration 32, key 69 remaining in annular groove 37. The tool may then be rotated clockwise until side 55m lockingly abuts flat 35.

After each indexing, tap 20 is fed at a desired chamfer angle to face F of grinding wheel W (FIG. VI). By rotating handle 56 about spindle 43, sleeve 45 follows stud or cam follower 47, advancing bushing 50 and tap 20 together across face F (to the left in FIG. VI). Simultaneously, the axis of tap 20 rotates coincidentally with the axis of the internal bore of eccentric bushing 50, and therefore revolves about the axis of spindle 43, moving perpendicularly into the plane of face F as it is being rotated forwardly across face F. After each indexing step and grinding operation on tap 20, holder 40 is retracted from its advanced position to its initial position, after which pin 55 is cammed to the remaining surfaces or points of registry 33, 34, 35 mounted on tap 20, and the same precise, accurate movement of the portions of the cutting edges of tap 20 across and into face F is reproduced, since each flute of tap 20 has been correlated to a particular surface of registry that was manufactured or otherwise incorporated into the tool itself.

The grinding action for successively obtaining a predetermined relief on a cutting edge of tap 20 is illustrated by schematic FIGS. XI through XIV, where the turning axis of spindle 43 is indicated at A and the axis of tap 20, coincident with the axis of the bore of eccentric bushing 50 in spindle 43, is indicated at B. The entire length of the desired chamfer for tap 20 is aligned parallel with the plane of face F so that all teeth of the cutting edge of tap 20 strike face F simultaneously. Handle 56 on sleeve 45 and indexing pin 55 in handle 56 are rotated, thereby rotating bushing 50 in the bore of spindle 43, and revolving tap 20 and its cutting edge 27 about axis A. Tooth 27A moves from the position shown in FIG. XI to that shown in FIG. XII, and further to the positions shown in FIGS. XIII and XIV, as handle 56 on sleeve 45 is rotated throughout the entire arcuate length determined by stud 47 and arcuate slot 46 in sleeve 45. The radial relief generated on tooth 27A, due to the eccentricity of bushing 50 in spindle 43 is indicated by the radial clearance between the lines $c$ and $f$ on tooth 27A in FIG. XIV, where line $c$ represents the periphery of tooth 27A at the commencement of grinding thereof shown in FIG. XI, and $f$ represents the periphery of tooth 27A at the finish of the grinding operation shown in FIG. XIV.

It is to be remembered that as radial relief is being generated upon tooth 27A, cutting edge 27 is being longitudinally advanced across face F of the grinding wheel W, such advancement being determined by the helical nature and design of slot 46 on spindle 43. Thus, looking at FIGS. XI through XIV, the lead end of the tool is advanced axially and towards the reader as it is resolved into face F. The leading edge 1 of tooth 27A and of each other tooth of tap 20 is rotated downwardly out of engagement with face F, and the remaining width of each tooth (into the drawing sheet, i.e.) towards its trailing edge *t* (which contacts face F) is being axially relieved. The axial movement of tooth 27A does not impair or shorten the desired radial relief that is being incorporated into tooth 27A, extending from the leading edge *l* of tooth 27A to its trailing edge *t*, as a result of the eccentricity built into bushing 50. The net relief obtained on tooth 27A during the grinding operation thereon, therefore, is a combination of a continuing deepening radial relief into the thickness of tooth 27A from its leading edge *l* towards its trailing edge *t*, due to the eccentricity designed into bushing 50, and a corresponding axial relief being generated across or along the width of tooth 27A thereon, that is, with minimum tool diameter at the lead end of tool 20 and with greater diameter between the lead end and the shank 21, due to the helical nature of slot 46 in sleeve 45.

What relief has been generated for tooth 27A as described above is the exact same relief generated for every other tooth along the chamfer of cutting edge 27 that is fed to face F of the grinding wheel.

The relief generated into cutting edge 27 is a predetermined, constant, effective cutting relief desired for tap 20. The true measurement of such relief is now apparent to be dependent upon he helical nature of slot 46 in sleeve 45 and the eccentrically located bushing 50. The structures of holder 40 and bushing 50 include the mathematically-calculated or predetermined cutting relief in the form of the nature of and the bounding limits of slot 46 with stud 47 and the eccentricity formed in bushing 50. In this manner, a true measurement of effective cutting relief is accomplished and is transferred directly to tap 20 in the grinding and regrinding thereon. The natures of slot 46 and bushing 50 are, of, computed by well-known methods used in cam design.

Thus, the nature of the threads of a bolt, shaft, or the like, having been calculated or being otherwise known, holder 40 is designed to include therein, by means of a particular slot 46 and a particular eccentric bushing 50, a nature precisely corresponding to the spacings between the threads of a threaded bolt, whereby the tapped-hole finish in the bored hole will mesh perfectly with the threads of the bolt to effect a connection having no unnecessary or undue stress or strain imposed on, between, or in, the threads of the hole and threads of the bolt threaded therein due to the torque applied to the bolt upon tightening thereof in the hole.

FIGS. XV through XXIV illustrate modifications of my invention in which different types of indexing means are included as various kinds of surfaces or points of registry that are incorporated into a rotary cutting tool or an accessory thereto and which surfaces cooperate with an indexing or locating pin mounted on or in association with a holder or accessory thereto, thereby obtaining particular types of movement of the tool during sharpening or grinding operation thereon, as well as providing for indexing which is consistent, accurate, and exact, for all cutting edges on the tool.

FIGS. XV and XVI show a shank 21*a* of a tool 20*a* having surfaces of registry provided along the cylindrical walls of bores 80, 81, 82, 83 therein, the diameters of which are equal and whose respective axes lie wholly within a plane perpendicular to the tool axis, and whose orifices correspond to the same number of fluted surfaces of the tool. These bores, of course, are radially spaced about shank 21*a*, and each particular tool flute machined into tool 20*a* is correlated to a separate and distinct one of the orifices of a bore as was similarly seen in the case of surfaces of registry 31, 32, 33, 34 to flutes 27, 28, 29, 30, respectively in tap 20. The plane in which the axes of the bores lie acts as the means by which the plurality of cutting edges of the tool are axially aligned. An arcuate helical slot 46*a* is provided in a spindle 43*a* of a holder 40*a* in a similar manner as in the case of slot 46 in sleeve 45 of holder 40. An indexing pin 55*a* extends through slot 46*a* and projects into the orifice of bore 82 to register therewith, thereby indexing tool 20*a* to holder 40*a*. To accomplish successive indexing of tool 20*a* after one grinding operation has been completed thereon, pin 55*a* is removed from bore 82, the tool rotated to expose the orifice of the next bore, and the pin inserted therein. Axial relief is generated along each cutting edge of tool 20*a* as indexing pin 55*a* is moved across the length of arcuate helical slot 46*a*.

FIG. XVII shows the use of a "whistle notch" type of registry 31*b* in a shank 21*b* of a tool 20*b*. Flat 35*b* extends radially inwardly of shank 21*b* while plane surface or bottom 36*b* of the recess formed lies wholly in a plane which proceeds at an angle from flat 35*b* to the periphery of shank 21*b*. Indexing pin 55*b* is so configured as to have its end be exactly accommodated to or registered upon the bottom 36*b* made in shank 21*b* after being slipfitted through an aperture 51*b* of an eccentric 50*b* similar to bushing 50. A small void *v* exists between flat 35*b* and the side of pin 55*b*, if such is desired. The base of tool 20*b* engages the bottom of the bore of bushing 51*b* in order to axially align the tool's fluted surfaces with respect to each other. Similar "whistle notch" registries to that of registry 31*b* are provided about shank 21*b*, such as shown at 32*b*, the number and spacing depending, of course, on the number and spacing of the fluted surfaces in tool 20*b*.

FIGS. XVIII and XIX illustrate another variation in structure embodying the invention, in which a surface of registry 31*c* and a cammed surface 36*c* are incorporated into the butt of a four-fluted tool shank 21*c*. Surface of registry 31*c* comprises a wall 35*c* longitudinally of and coincident with a plane passing through the axis of a tool 20*c*, and which wall projects into the body of shank 21*c* from its butt end. Tool 20*c* is indexed to a spindle 43*c* of a holder 40*c* by means of wall 35*c* engaging indexing and locating pin 55*c* which is securely fixed in the bottom of the bore of spindle 43*c*, at an off-center point, preferably abutting the internal cylindrical wall of the bore of spindle 43*c* or abutting the cylindrical shank surface of tool 20*c* as shown in FIG. XIX. Cammed surface 36*c* extends from the base of surface of registry 31*c* to the extreme end of the butt of shank 21*c* where the next adjacent surface of registry 32*c* begins as seen in FIG. XIX. Cammed surface 36*c* is so designed, arcuately as shown, or perhaps as a portion of a plane, so as to incorporate into tool 20*c* means providing for the required kind of axial displacement of the tool in spindle 43*c*. In other words, the function of cammed surface 36*c* is similar to that of slot 46 in holder 40. Upon tool 20*c* being caused to rotate in spindle 43*c*, the tool is axially displaced by means of cammed surface 36*c* riding on fixed pin 55*c* until pin 55*c* registers with the extreme butt end of shank 21*c* where the next surface of registry begins. Thus, by associating cammed surface 36*c* to wall 35*c*, tool 20 is capable of being axially displaced of holder 40*c* and simultaneously successively directly indexed to its next indexing position in holder 40*c*. In this manner, axial relief is generated for tool 20*c* along a cutting edge whose fluted surface has been correlated to surface of registry 31*c*, while progressively indexing the tool.

The form of invention shown in FIG. XX also generates an accurate and consistent axial relief for each of a tool 20*d*'s cutting edges. A plurality of helical arcuate cammed slots, one of which is shown at 31*d*, is incorporated into the shank 21d, to each of which a particular fluted surface in tool 20d has been correlated. An indexing pin 55d is stationarily mounted on a spindle 43d of a holder 40d adapted for tool 20d, which pin is also reciprocably guided radially through the spindle as shown. Shaft 55s of pin 55d slip-fits in recess r provided in spindle 43d, while end 55p of pin 55d projects through a hole h of spindle 43d, thereby being capable of riding in cammed slot 31d. End 55p is of the same size or diameter as the width of slot 31d (a slip-fit, i.e.). When tool 20d is caused to rotate, it will be axially displaced in spindle 43d to the extent of the length of helical slot 31d riding in end 55p. After a completed grinding of the fluted surface correlated to slot 31d, pin 55d is removed from slot 31d, and the tool is rotated so that it may be directly successively indexed to the holder 40d by means of end 55p riding in the next adjacent cammed slot such as shown at 32d.

FIG. XXI shows an adaptation of the invention to a conventional tang 22e on either a straight or tapered shank 21e of a rotary cutting tool 20e, and in which axial relief is generated on the tool. In this modification, tang 22e was formed as an integral part of tool 20e during manufacture prior to incorporation of any fluted surfaces in the tool. Each fluted surface can then be correlated to the tang 22e which acts as a surface or point of registry that is capable of being directly and precisely indexed to its accessory or to an accessory of a holder for a rotary cutting tool. Such accessory is an adaptor 50e comprising a cylindrical portion 50x adapted to slip-fit upon the tapered shank 21e of the tool, and an end portion 50y abutting cylindrical portion 50x and adapted to be held in proper position in the holder during a grinding operation, as will be hereinafter pointed out. End portion 50y is provided with a plurality of indexing means in the form of slotted surfaces $s_1$, $s_2$, $s_3$, $s_4$, in the base z thereof, each slotted surface corresponding to a particular fluted surface in tool 20e which fluted surface has been correlated to such slotted surface. Tang 22e is accommodated in the way of a slip fit to any one of such surfaces thereby indexing same to bushing 50e. A cam follower 90 is stationarily mounted on the spindle of a holder (not shown) into which bushing 50e is inserted, but which is nevertheless reciprocable in, or otherwise reciprocably provided for in a slot 46e in the cylindrical wall of adaptor 50e, such follower having a slip-fit with slot 46e thereby. Tang 22e thus cooperates with each of the indexing means provided in end portion 50y, i.e., with any one of the plurality of slotted surfaces $s_1$, $s_2$, $s_3$, $s_4$, and consequently, with its holder by means of slot 46e and follower 90. The angular spacing of the slotted surfaces in the base z of end portion 50y is identical to the angular spacing of the fluted surfaces on tool 20e that is to be sharpened, whereby once again a consistent grind upon the cutting edges and their trailing portions of tool 20e is effected upon successively indexing tool 20e to adaptor 50e. The function of each of slotted surfaces $s_1$, $s_2$, $s_3$, $s_4$, corresponds to the function of indexing pin 55 in the main embodiment described above, to the extent that tang 22e is successively indexed to each of such surfaces during the grinding operation. In such operation, tool 20e is caused to rotate, and by such movement, is axially displaced of the holder since tang 22e cooperates with the holder by means of one of the slotted surfaces $s_1$, $s_2$, $s_3$, $s_4$, on end portion 50y and arcuate helical slot 46e provided therein which rides on follower 90 stationarily mounted on the holer. After one grinding operation has been performed on tool 20e, tang 22e is removed from a slotted surface, say $s_4$, bushing 50e and tool 20e is returned to initial position, and tang 22e is reinserted in the next adjacent slotted surface such as $s_1$. The grinding operation is then repeated.

It is conceivable that end portion 50y include blind slotted surfaces, i.e., slotted recesses within the base at the bottom of the bore of end portion 50y. Thus, it should be understood that the through slotted surfaces $s_1$, $s_2$, $s_3$, $s_4$, shown in FIG. XXI may take that form if desired.

FIGS. XXII, XXIII and XXIV illustrate the use of surfaces or points of registry upon a concentric bushing 50f as compared to such surfaces on the shank of a tool itself. The surfaces of registry in bushing 50f, two of which are shown at 31f and 32f in FIG. XXII, may be like those in tap 20. Concentric bushing 50f is made to slip-fit upon either a straight shank 21f (FIG. XXII) or on a tapered shank 21ft (FIG. XXIV) of a tool 20f having a tang 22f. In the instant embodiment, the shank 21f is inserted or slip-fitted into the bore of bushing 50f which defines a plurality of surface or points of registry 31f, 32f, ... angularly spaced about its periphery in the same manner as was surfaces of registry 31, 32, 33, 34 angularly spaced on tap 20. In order to establish a fixed relationship between bushing 50f and tool 20f so that each of the fluted surfaces on tool 20f are correlated to its respective surface of registry on the bushing 50f, a locating pin 95 is securely fixed longitudinally of bushing 50f in the bottom thereof, off-center with respect to the axes of the bushing and the tool 20f inserted therein. The closer pin 95 is to an edge of tang 22f, as schematically seen in FIG. XXIII, a stronger fixed relationship between bushing and tool is formed after locating pin 95 has engaged tang 22f. The engaging of and positioning of locating pin 95 upon tang 22f correlates a particular fluted surface on the shank of tool 20f to a separate and distinct surface of registry on bushing 50f. Of course, a specified number of surfaces of registry on bushing 50f is incorporated therein for the like number of fluted surfaces existing in tool 20f. Bushing 50f is easily adaptable for a holder such as holder 40. An eccentric bushing (not shown) is readily applicable to this embodiment of the invention, by fitting it about concentric bushing 50f and then inserting both into the bore of the spindle of a holder such as 40.

It should be noted that in each of the embodiments of the invention disclosed herein, the tool may be axially positioned against the bottom of the bore of the particular spindle or bushing in which it is inserted were not other means, such as annular groove 37, used to determine axial alignment of the cutting edges on a rotary tool during a grinding operation.

The incorporation of surfaces of registration into standard rotary cutting tools is possible by incorporating such surfaces into the tool, each one incorporated with respect to a particular fluted surface of the tool, thereby making it possible to correct and provide for a consistent accurate grind upon the cutting edges and their respective trailing portions, which grind will also include a true measurement of the effective cutting relief that is inherent in the novel structure of the tool holding device disclosed herein.

FIG. XXV represents a different technique of sharpening tools by which the invention is also capable of being practiced. Comparing FIG. XXV to FIGS. XI through XIV, it will be seen that in FIG. XXV the axis of revolution ar of a tool lies between the grinding face F and the axis of rotation rr of the tool, during a grinding cycle. A somewhat different form of clearance or relief for each of the cutting edges of the tool is thus generated in this technique as compared to that shown in FIGS. XI through XIV in which the positions of the above mentioned axes of revolution and rotation are reversed, since the radius of revolution ar of the tool is shorter than that shown in FIGS. XI–XIV.

The invention has been described in relation to a tap drill in which the fluted surfaces therein extend substantially the length of the stock or shank of the tap drill. A series of teeth or ribs are incorporated in the shank of the tap drill along substantially the entire length of the fluted surface. The shank is chamfered along the end of each of its fluted surfaces to provide for the cutting edges on the tool. However, in other tools to which the invention is adaptable, the fluted surfaces thereof may be found only in the actual cutting portion of the tool. For example, in a counter-sink drill, the fluted surfaces may be limited to the cutting portion thereof, and do not extend substantially along the stock or shank thereof. Nevertheless, in such instances, these fluted surfaces can be correlated to their respective surfaces of registry incorporated into the particular tool in the various ways as was described above, and it should be understood that, therefore, this invention may be practiced upon any rotary cutting tool having fluted surfaces therein.

The invention is also capable of being practiced upon a brazed construction of a carbide rotary cutting tool. For example, in a countersink tool, its fluted surfaces in its cutting portion are formed therein, after which a carbide cutting element of suitable thickness is brazed to each of the fluted surfaces. After the brazing process has been completed, and before relief is generated into the carbide cutting elements, a surface of registry corresponding to each carbide element may then be incorporated into the shank of the countersink drill whereby the brazing element is then accurately relieved consistently thereafter in accordance with the principles of the invention disclosed herein.

It is to be understood that various changes and modifications may be made in the embodiment of my invention herein described and illustrated, in size, shape, materials and arrangement, without departing from the spirit and scope of the invention as claimed.

Therefore, what I claim as new and patentable is:

1. A device for holding a rotary cutting tool which device co-operates with the cutting tool to accurately index said tool to said device, said device comprising in combination a spindle having a concentric bore therein, a cam follower fixed to said spindle, a sleeve mounted for rotation about said spindle and having an arcuate cam-slot therein which cooperatively receives said cam follower, said spindle having a clearance opening therein communicating with its concentric bore, means within said concentric bore for receiving the tool, and an indexing pin mounted on said sleeve and radially reciprocable through said sleeve and clearance opening into the concentric bore and means in said spindle, whereby said indexing pin may co-operate with a surface of registry on the portion of a cutting tool in said means in the concentric bore of said spindle for indexing the cutting tool to said device.

2. A device for holding a rotary cutting tool which device co-operates with the cutting tool to accurately index said tool thereto, comprising in combination a spindle having a concentric bore therein, a cam follower fixed to said spindle, a sleeve mounted for rotation about said spindle and defining an arcuate helical cam-slot therein which co-operatively receives said cam follower, said spindle defining an arcuate opening therein having communication with the concentric bore, means within said concentric bore for receiving the tool, and an indexing pin mounted on said sleeve and radially reciprocable through said sleeve and arcuate opening into the concentric bore and means in said spindle, whereby said indexing pin may co-operate with a surface of registry on a portion of the cutting tool in said means in the concentric bore of said spindle for indexing the cutting tool to said device.

3. In a device for holding a rotary cutting tool which device co-operates with the cutting tool to successively index said tool, the combination comprising a spindle having a concentric bore therein, an adaptor defining an aperture therethrough slidably receivable in the concentric bore of said spindle, a cam follower mounted on said spindle, a sleeve mounted for rotation about said spindle and defining an arcuate helical slot in which said cam follower is co-operatively received, said spindle having a clearance opening therein, and an indexing pin of slip-fit size with respect to the aperture in the adaptor mounted on and radially reciprocable through said sleeve and clearance opening and aperture into the bore of said adaptor, whereby said indexing pin may cooperate with a surface of registry on a cutting tool inserted into the adaptor in the concentric bore of said spindle.

4. A device for holding a rotary cutting tool comprising in combination, a spindle having a concentric bore, said spindle having a clearance opening therein communicating with its concentric bore, means within said concentric bore for receiving the tool, a cam follower fixed to said spindle, a sleeve having an arcuate helical cam-slot therein and mounted for rotation about said spindle and axially displaceable of said spindle to the limits of the length of the arcuate helical slot therein which cooperatively receives said cam follower, and an indexing pin mounted on said sleeve and radially reciprocable through said sleeve, said pin extending through said sleeve and clearance opening of and said means in said spindle thereby being capable of engaging a surface of registry on the cutting tool inserted in said device.

5. A device for holding a rotary cutting tool having a surface of registration capable of co-operating with said device to precisely index or to rotate the tool, comprising in combination, a spindle having a bore for the insertion of the tool,
an indexing pin mounted on and extending into said spindle and projecting into said bore for engagement with a surface of registration of the tool, and
means provided for rotation of said pin about said spindle in association with said spindle,
whereby upon said pin engaging a surface of registration of the tool, the tool is capable of being rotated by said pin in accordance with a predetermined motion of rotation for the tool incorporated into said device as part of said means.

6. A device for holding a rotary cutting tool having a surface of registration capable of co-operating with said device to precisely index or to rotate the tool, comprising in combination, a spindle having a bore for the insertion of the tool,
an indexing pin mounted on and extending into said spindle and projecting into said bore for engagement with a surface of registration of the tool, and
means provided for rotation of said pin about said spindle in association with said spindle,
whereby upon said pin engaging a surface of registration of the tool, the tool is capable of being rotated by said pin in accordance with a predetermined motion of rotation for the tool incorporated into said device as part of said means, said means comprising an arcuate slot in said spindle of a width of slip-fit size to said indexing pin whereby said pin registers along the opposed spaced portions of the spindle defining said slot.

7. A device for holding a rotary cutting tool having a surface of registration capable of co-operating with said device to precisely index or to rotate the tool, comprising in combination, a spindle having a bore for the insertion of the tool,
an indexing pin mounted on and extending into said spindle and projecting into said bore for engagement with a surface of registration of the tool, and
means provided for rotation of said pin about said spindle in association with said spindle, whereby upon said pin engaging a surface of registration of the tool, the tool is capable of being rotated by said pin in accordance with a predetermined motion of rotation for the tool incorporated into said device as part of said means, said means comprising an arcuate helical slot in said spindle of a width of slip-fit size to said indexing pin whereby said pin registers along the opposed spaced portions of the spindle defining said helical slot.

8. In a device for holding a rotary cutting tool which device co-operates with the cutting tool to successively index said tool, the combination comprising a spindle having a concentric bore therein, an adaptor defining an aperture therethrough slidably receivable in the concentric bore of said spindle, a cam follower mounted on said spindle, a sleeve mounted for rotation about said spindle and defining an arcuate slot in which said cam follower is co-operatively received, said spindle having a clearance opening therein, and an indexing pin of slip-fit size with respect to the aperture in the adaptor mounted on and radially reciprocable through said sleeve and clearance opening and aperture into the bore of said adaptor, whereby said indexing pin may cooperate with a surface of registry on a cutting tool inserted into the adaptor in the concentric bore of said spindle.

9. A device for holding a rotary cutting tool comprising in combination, a spindle having a concentric bore, said spindle having a clearance opening therein communicating with its concentric bore, means within said concentric bore for receiving the tool, a cam follower fixed in said spindle, a sleeve heving an arcuate cam-slot therein and mounted for rotation about said spindle and displaceable of said spindle to the limits of the length of the arcuate slot therein which cooperatively receives said cam follower, and an indexing pin mounted on said sleeve and radially reciprocable through said sleeve, said pin extending through said sleeve and clearance opening of and said means in said spindle thereby being capable of engaging a surface of registry on the cutting tool inserted in said means in said device.

10. In a device for holding a rotary cutting tool which device co-operates with the cutting tool to successively index said tool, the combination comprising a spindle having a concentric bore therein, an adaptor defining an aperture therethrough slidably receivable in the cencentric bore of said spindle, said adaptor being eccentric in nature, a cam follower mounted on said spindle, a sleeve mounted for rotation about said spindle and defining an arcuate helical slot in which said cam follower is co-operatively received, said spindle having a clearance opening therein, and an indexing pin of slip-fit size with respect to the aperture in the adaptor mounted on and radially reciprocable through said sleeve and clearance opening and aperture into the bore of said adaptor, whereby said indexing pin may cooperate with a surface of registry on the cutting tool inserted into the adaptor in the concentric bore of said spindle.

11. In a device for holding a rotary cutting tool which device co-operates with the cutting tool to successively index said tool, the combination comprising a spindle having a concentric bore therein, an adaptor defining an aperture therethrough slidably receivable in the cencentric bore of said spindle, said adaptor being eccentric in nature, and in which the aperture is positioned in the casing of the adaptor at its minimum thickness, a cam follower mounted on said spindle, a sleeve mounted for rotation about said spindle and defining an arcuate helical slot in which said cam follower is co-operatively received, said spindle having a clearance opening therein, and an indexing pin of slip-fit size with respect to the aperture in the adaptor mounted on and radially reciprocable through said sleeve and clearance opening and aperture into the bore of said adaptor, whereby said indexing pin may cooperate with a surface of registry on the cutting tool inserted into the adaptor in the concentric bore of said spindle.

References Cited by the Examiner

UNITED STATES PATENTS

| | | | |
|---|---|---|---|
| 511,607 | 12/93 | Gay | 29—103 |
| 1,202,195 | 10/16 | Lees | 29—103 |
| 2,486,044 | 10/49 | Lusk | 51—225 |
| 2,503,396 | 4/50 | Lentz | 51—225 |
| 2,700,258 | 1/55 | White | 51—225 |
| 2,859,569 | 11/58 | Salmon | 51—219 |
| 2,907,149 | 10/59 | Whitesel | 51—219 |
| 2,923,053 | 2/60 | Babbitt | 29—103 |

OTHER REFERENCES

American Machinist Publication, "Sensitive Drill Holder for Turret Lathe," page 134, dated Feb. 10, 1937.

WILLIAM W. DYER, Jr., *Primary Examiner.*

FRANK H. BRONAUGH, *Examiner.*